US005822458A

United States Patent [19]
Silverstein et al.

[11] Patent Number: 5,822,458
[45] Date of Patent: Oct. 13, 1998

[54] PRECOMPUTING AND ENCODING COMPRESSED IMAGE ENHANCEMENT INSTRUCTIONS

[75] Inventors: D. Amnon Silverstein, Oakland; Stanley A. Klein, Berkeley, both of Calif.

[73] Assignee: The Regents of the University of California, Oakland, Calif.

[21] Appl. No.: 384,561

[22] Filed: Feb. 6, 1995

[51] Int. Cl.[6] .................................................. G06K 9/40
[52] U.S. Cl. .......................... 382/235; 382/233; 382/254
[58] Field of Search .................................. 382/235, 275, 382/261, 254, 260, 263, 264, 284, 232, 233

[56] References Cited

U.S. PATENT DOCUMENTS

| | | | |
|---|---|---|---|
| 5,023,919 | 6/1991 | Wataya | 382/233 |
| 5,247,590 | 9/1993 | Fukuhara et al. | 382/233 |
| 5,359,676 | 10/1994 | Fan | 382/260 |
| 5,392,137 | 2/1995 | Okubo | 382/260 |
| 5,416,855 | 5/1995 | Geiger | 382/254 |

*Primary Examiner*—Leo Boudreau
*Assistant Examiner*—Christopher S. Kelley
*Attorney, Agent, or Firm*—Burns, Doane, Swecker & Mathis, LLP

[57] ABSTRACT

Traditional techniques such as filtering and edge enhancement have been applied to restoring images that have been distorted due to lossy image compression. However, these techniques have ignored a unique feature that can be exploited when working with digital compression. Before the image is stored or transmitted, the sender has access to both the original and the distorted images, enabling the encoder to transmit information specifying the regions where the enhancement was successful. To utilize this feature, before storage or transmission the sender produces a codec file, and assesses the efficacy of one or more enhancement schemes. To determine which image regions have been improved by the enhancement, the enhanced codec is compared to the original. A map of where the enhancement scheme was successful is encoded into the image by making tiny adjustments to the image itself. This method can comply with many compression standards, adds nothing to the compressed images' bandwidth, and distorts the image by only a very tiny amount. Examples are presented showing the reduction of distortion if enhancement is used, together with calculations of how much distortion is introduced if a standard decompressor is used.

6 Claims, 10 Drawing Sheets

PRECOMPUTING AND ENCODING COMPRESSED IMAGE ENHANCEMENT INSTRUCTIONS

This invention was made with Government support under Grant (Contract) No. F49620-92-J-0359 awarded by the AFSOR. The Government has certain rights to this invention.

BACKGROUND OF THE INVENTION

1. Field of the Invention

The present invention relates to image processing, more particularly to image enhancement techniques.

2. State of the Art

An image that has been compressed and decompressed (referred to herein as a "codec") becomes distorted if it was compressed by a lossy method. There are many enhancement methods for reducing the distortion, but in some regions of the image these methods may degrade the image further.

Methods for reducing the distortion introduced by the Joint Photographic Experts Group (JPEG) compression system are particularly needed. The JPEG compression algorithm often introduces a high-frequency 'ringing' artifact around high contrast edges. There are algorithms for removing this artifact, but sometimes the algorithm can mistakenly remove thin lines and smooth over important texture. In addition, there are often errors between adjacent 8×8 pixel image blocks created by opposite-signed round-off errors in the two blocks. A quick and easy way to remove these errors is by simply low-pass filtering the image. However, other image regions that contain important high frequency information will suffer a loss in fidelity. Likewise, many other post-processing algorithms are most effective when they are selectively applied only to certain regions of an image.

SUMMARY OF THE INVENTION

In order to facilitate image enhancement of a codec image, before storage or transmission of the image, the sender produces a codec file, and assesses the efficacy of one or more enhancement schemes. To determine which image regions have been improved by the enhancement, the enhanced codec is compared to the original. A map of where the enhancement scheme was successful is encoded into the image by making tiny adjustments to the image itself. This method can comply with many compression standards, adds nothing to the compressed images' bandwidth, and distorts the image by only a very tiny amount. Examples are presented showing the reduction of distortion if enhancement is used, together with calculations of how much distortion is introduced if a standard decompressor is used.

The invention therefore takes advantage of a unique feature that is available with compressed images but has been hitherto ignored: the encoder can compare the original and the distorted image, and can transmit information about where the enhancement method worked. Efficient methods are used for hiding the enhancement information.

The inventive method enables post-processing algorithms to be selectively applied only to certain regions of an image.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

In general, the present system uses a fidelity metric to assess an image enhancement scheme's success. The fidelity metric compares the unenhanced and the enhanced codec images to the original image. A map of where the fidelity of the enhanced image was higher is encoded into the compressed image file. The process is illustrated in FIG. 1.

Figure 1:
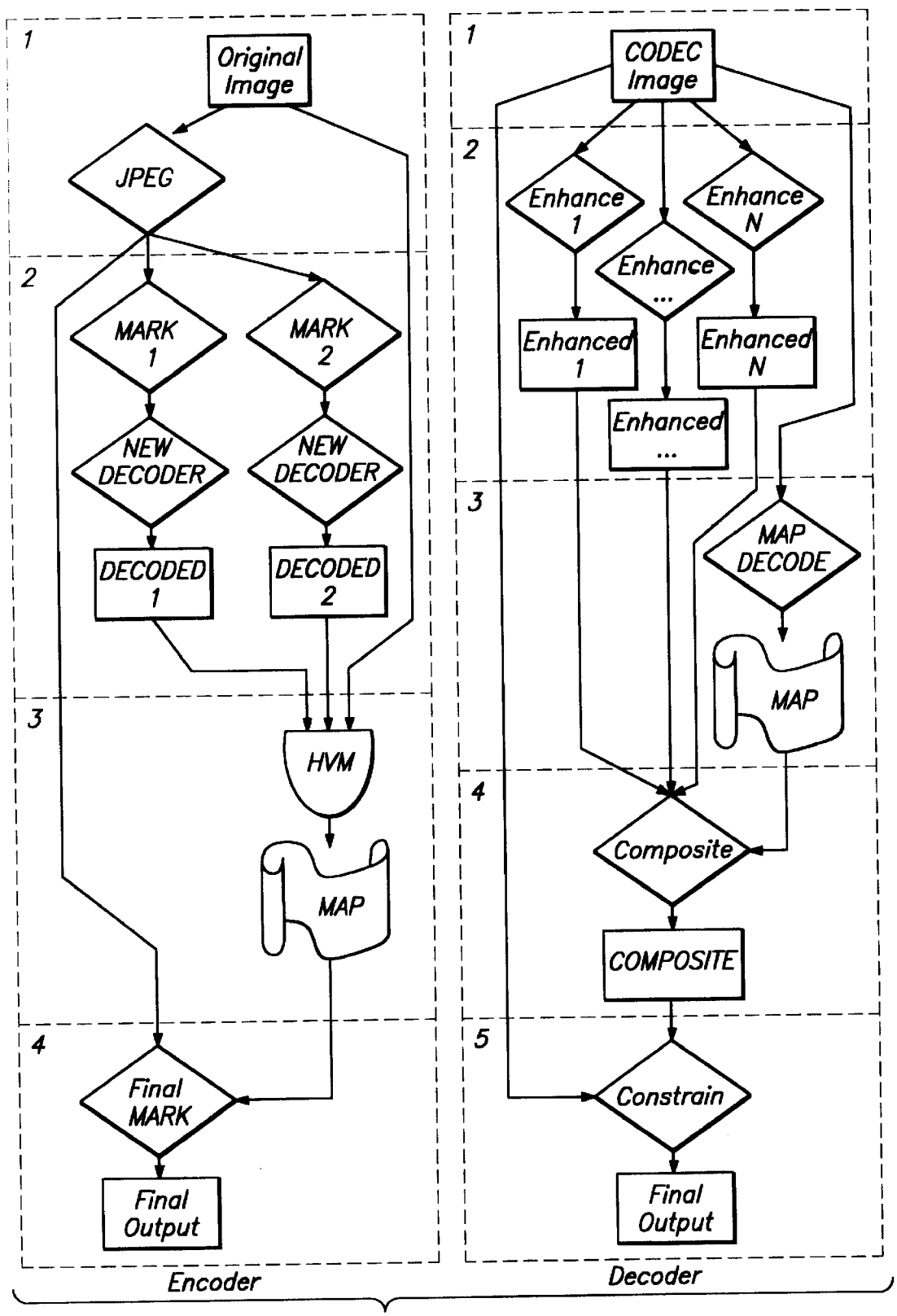
FIG. 1 is a flow diagram of a process for encoding and decoding images in accordance with the present invention.

Referring to FIG. 1, the present compression process adds several new stages of processing to the usual JPEG algorithm. Square boxes represent images, and diamonds represent operations. The left-hand portion of FIG. 1 illustrates an encoding process, and the right-hand portion of FIG. 1 illustrates the corresponding decoding process. Both the encoding and the decoding processes are divided into a series of steps for convenience of description.

Considering first the encoding process, in Step 1, the original image is compressed (with JPEG for example, although other compression techniques may be used as well).

In Step 2, the compressed image is marked with two different marking schemes (MARK 1 and MARK 2). In the MARK 1 image, all blocks are marked for enhancement. In the MARK 2 image, all blocks are marked for no enhancement. The marks are stored as parity changes by making tiny adjustments to the image, as will be discussed. The two marked image files are then decompressed and enhanced or not, as marked, using the decoder shown on the right side of FIG. 1. Two resulting codec images are produced with image 1 being enhanced throughout and image 2 not being enhanced anywhere. Although FIG. 1 only illustrates processing with a single enhancement scheme, any number of enhancement schemes can be used, as will be discussed in more detail later.

In Step 3, the two images are compared to the original with a fidelity metric indicated in FIG. 1 as HVM (human vision model), that can choose, block by block, which of the two images has higher fidelity relative to the original. The output of this stage may be, for example, a binary map that indicates which of the two image regions has the highest fidelity. Alternatively, instead of just one enhancement scheme, we can have any number of schemes. For example, a three-level map can be used to indicate which of two enhancement schemes (plus the no enhancement alternative) produced the highest fidelity output.

In Step 4, After the marking map has been produced, it is encoded into the final output file with minimal cost (in terms of perceptual error and bandwidth, as will be discussed). Some areas of the image may not be markable, and these will receive special processing in a later step.

Considering now the decoding process, in Step 1, the image is reconstructed by first applying the standard decoder. At this stage an image is produced which is of equal fidelity to the original (or very nearly) as would be produced if the compressed image file had been produced by the standard encoder.

In Step 2, after the codec image is produced, it is enhanced by the same enhancer, or battery of enhancers, that were used by the compression stage (Enhance 1 . . . N in FIG. 1). The entire image is enhanced with each enhancer at this stage, instead of enhancing individual image blocks after we have decoded the map indicating which enhancement scheme is most effective for which regions of the image. Most enhancement schemes are less effective if they are constrained to enhancing only within single blocks.

In Step 3, the map (indicating which enhancement scheme is most effective for which regions of the image) is decoded from the image file. In a variation of the present marking scheme, some blocks will be unmarkable (as will be discussed). In this case, a map of which blocks could not be marked will be decoded as well.

In Step 4, final composite image is constructed by using the map to choose between the best parts of each enhanced image. The areas that could not be marked are treated with a special enhancement scheme. To avoid discontinuities between enhanced areas, the marking map is first lowpass filtered, enabling the enhanced images to be smoothly composited. This step is shown in more detail in the example below.

With a JPEG image, the coefficients define a range of possible values from which the original image values must have come. This constraint may be used to limit the values of the composite image. This is done is Step 5 by applying the Discrete Cosine Transform (DCT) to the composite image, and truncating each value to the nearest possible value that is within the bounds of the JPEG compressed image. This measure guarantees a smaller mean-square error between the final output image and the original image, and almost certainly increases the fidelity of the final image.

Figure 2A:
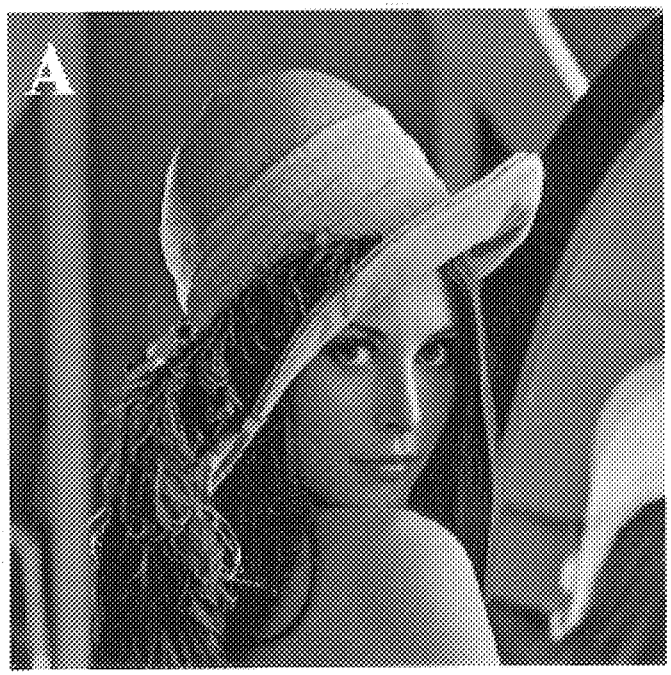
FIG. 2A shows an original Lenna image.
Figure 2B:
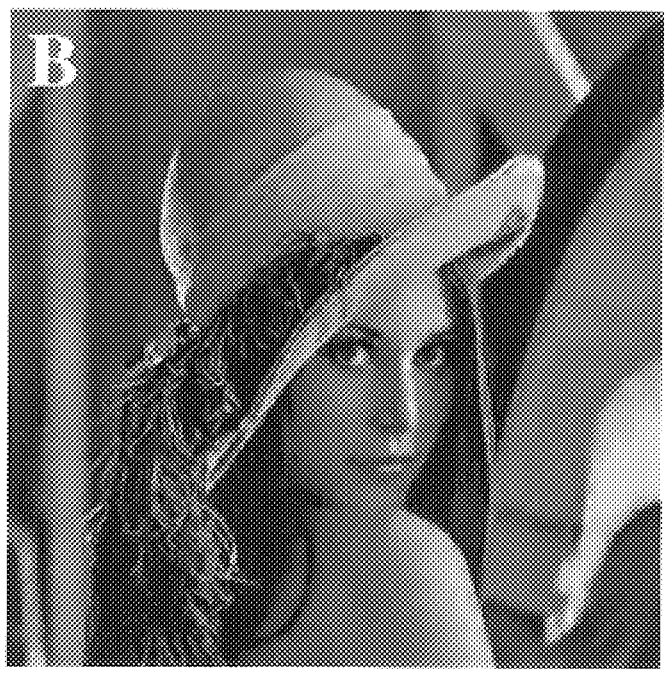
FIG. 2B shows a marked file after it has been decompressed and enhanced.
Figure 2C:
FIG. 2C shows an image that has been compressed and decompressed with standard JPEG.
Figure 2D:
FIG. 2D shows an image that had been compressed with the special encoder described in this paper, but decompressed with the standard JPEG decoder.

The various parts of the present processing scheme may be more fully understood with an example. The results of the process are shown in FIG. 2A through FIG. 2D. FIG. 2A shows an original Lenna image used throughout the present description. The image consists of 512×512 pixels digitized to 256 levels of gray. The choice of a test image is not critical at this stage. FIG. 2C shows an image that has been compressed and decompressed with standard JPEG. FIG. 2D shows an image that has been compressed with the special encoder described herein, but decompressed with the standard JPEG decoder. Both have been compressed using a quantization matrix 8 times the example matrix in the JPEG standard. FIG. 2B shows a marked file after it has been decompressed and enhanced. The enhancement stage was guided by the map that was included with the JPEG file. The images in FIG. 2B, FIG. 2C and FIG. 2D are all 0.2 bits/pixel.

A key to the present method is to produce a map that shows where an enhancement scheme will succeed or fail. For illustrative purposes, a very simple enhancement scheme, and a very simple method for deciding in which blocks the scheme would fail, were chosen for the present example. The enhancement scheme was simply low-pass filtering. As a prediction of where the enhancement would fail, Adobe Photoshop's™ built-in edge detection system was used instead of using a fidelity metric. The presumption is that only regions without clear edges should be blurred. Although more sophisticated techniques may be used, even with these relatively simple techniques, good results were achieved.

Figure 3A:
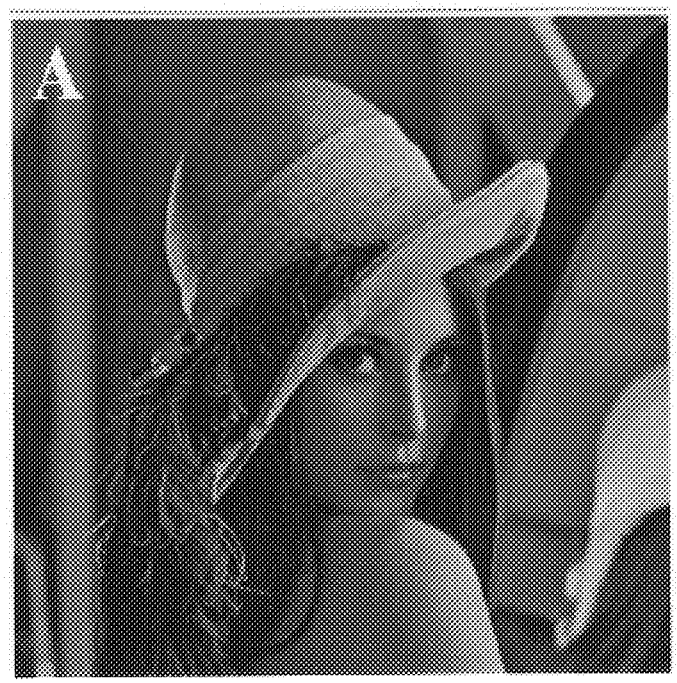
FIG. 3A shows an original Lenna image.
Figure 3B:
FIG. 3B shows a prediction image used to predict where the image enhancement scheme will fail, produced using an edge detection feature of Adobe Photoshop™.
Figure 3C:
FIG. 3C shows the prediction image of FIG. 3B after it has been subsampled to 8×8 pixel blocks and thresholded to two levels.

With a one-level marking map, 1 bit of information marking information can be encoded per 8×8 block. In each 8×8 block of FIG. 3B, the sum of the absolute value of the edge strength was calculated. Then a threshold level was chosen (such that around 25% of the blocks were marked) to produce the binary map shown in FIG. 3C.

Figure 3D:
FIG. 3D an image file having the marking map of FIG. 3C invisibly encoded into the image after the image file has been decompressed by a standard JPEG decompressor.

After the marking map was constructed (FIG. 3C), it was encoded into the JPEG image file in a way that is easily reconstructed, is transparent to the standard decompressor, does not increase bandwidth and does not distort the image significantly. The image file produced by the system can also be decompressed on a standard decompressor, as shown in FIG. 3D; however a special decompressor will produce superior results (as will be discussed).

The JPEG algorithm starts by dividing an image into 8×8 pixel blocks. Each of these image blocks is then transformed with the Discrete Cosine Transform (DCT) into a matrix of frequency coefficients. The DCT matrix is then divided by a quantization matrix, and each coefficient is rounded off to the nearest value. At this point information is lost. For example, a DCT coefficient may have a value of 7.3 before rounding off. After rounding to 7 it will have 0.3 of a quantization level of error. For evaluation purposes, the error is best computed at this stage, after division by the quantization matrix, because it is a closer estimate of the added perceptible error than the more standard mean-square error (MSE) between the pixels of the original and the compressed images. The quantization matrix is an approximate measure of the relative sensitivity to errors in each DCT coefficient.

The parity of the summed DCT values was used to store additional information. To do this, the parity was forced to a desired state by adjusting one of the DCT coefficients, thus introducing some additional distortion. However, the coefficient that was adjusted was judiciously chosen to minimize the perceptibility of this distortion.

One of the DCT coefficients is closer to being half-way between two levels than the others. This coefficient's least significant bit contributes less to the reconstructed image's MSE than the other bits. This "wasted" bit may be used to represent important data such as the marking map. For example, say we have coefficients with values 22.31, 12.42, 7.51, 6.70. Normally, these numbers would be rounded to: 22, 12, 8, 7. Instead, the coefficient that is closest to the half-way point is rounded to force the sum to have the proper parity to encode the desired enhancement scheme as follows: 22 12 (7 or 8) 7. Half of the blocks already have the correct parity. Many blocks may not be significantly improved or degraded by the enhancement routine and therefore can be left with whatever parity they happen to have. Blocks which are significantly improved or degraded by the enhancement routine and are the wrong parity are marked by increasing or decreasing one coefficient by 1. In this example the change in the sum of squared errors is $(7.51-7)^2-(7.51-8)^2=0.02$.

One parity code that could be used would mark all blocks needing post-processing as having even parity. However, in very low bit rate images with very few non-zero DCT coefficients this coding can lead to low frequency blocking artifacts where a component slowly changes levels over several blocks that are all marked with the same parity. For example, a row of six blocks may have constant AC coefficients and a DC coefficient that is changing gradually with the pre-quantized values of 10.2, 9.7, 9.2, 8.7, 8.2, 7.7. Normal JPEG would have blocks with DC levels of 10, 10, 9, 9, 8, 8. If the blocks all had even forced parity they would have DC levels of: 10, 10, 8, 8, 8, 8.

To eliminate the level jump of value 2 from 10 to 8, for the example in FIG. 2A through FIG. 2D, a dithered parity scheme was used. The image blocks were divided up in checkerboard fashion, and on every other check, the meaning of even and odd parity was reversed. This coding gives the following DC levels: 10, 9, 10, 9, 8, 7 or 11, 10, 9, 8, 9, 8 depending on the choice of parity for the upper-left most block. The 10–8 jump is removed at the cost of an overall slight checkerboarding of the severely quantized areas. The error is distributed more evenly across the image and allows some post-processing schemes (e.g. blurring) to be more effective.

If there are too few DCT components in some blocks, a large average error may result if these blocks are marked. Instead, blocks may be required to have a minimum number of coefficients in order to be markable. All other blocks will be unmarkable. The decoder must then decide what to do with unmarkable blocks, but this decision is easy to make with most post-processing schemes as will be discussed below. For the Lenna example, a block was considered to be unmarkable if all its AC coefficients were zero.

Figure 4A:
FIG. 4A shows a three-level map used for compositing the codec image of FIG. 3D with the two processed images of FIG. 4B and FIG. 4C to produce the final image of FIG. 4D.
Figure 4B:
FIG. 4B shows the codec image of FIG. 3D after it has been severely low pass filtered to eliminate edges between the blocks with only DC coefficients.
Figure 4C:
FIG. 4C shows the codec image of FIG. 3D processed with an enhancement scheme of simple low-pass filtering.

The final image will be a composite of three images I(n,x,y), where n is the image number and x and y index the pixel values. Shown in FIG. 4B is the first image I(1,x,y). It is an image that has been enhanced to improve the unmarkable blocks. In this example, if a block had only one DCT coefficient, it was considered unmarkable. Since these blocks only have a DC level, they are likely to contain artifactual sharp edges at their boundaries. To remove these spurious edges, the image was filtered with a severe low-pass filter (a Gaussian filter with a standard deviation of 8 pixels). The second image, I(2,x,y), is the unenhanced codec image shown in FIG. 3D. It is the image that would be produced by a standard JPEG decoder. The third image, I(3,x,y), shown in FIG. 4C, is produced using the enhancement scheme for the marked blocks. In this case, another simple low-pass filtering was used (a Gaussian filter with a standard deviation of 3 pixels), but since it only served to smooth together the higher frequency components, it did not need to be as severe as the lowpass filter used on the unmarkable blocks.

Figure 4D:
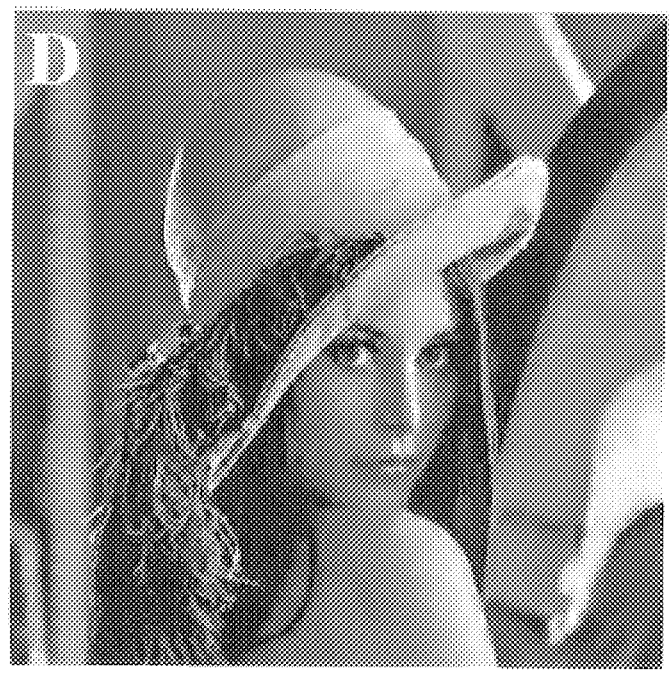
FIG. 4D shows a final composite image consisting of the image of FIG. 4B wherever the marking map is white, the image of FIG. 4C wherever the marking map is gray, and the codec image of FIG. 3D wherever the marking map is black.

Instead of stitching together blocks from the three images in an abrupt manner, there are smoothly blended to form a final output image $I_{composite}$. The interpolation formula is given by:

$$I_{composite}(x, y)=\int W(x-x', y-y')I(M(x', y'),x', y')dx' dy', \quad (1)$$

where $W(\Delta x, \Delta y)$ is a two-dimensional weighting function (Gaussian with a standard deviation of 3 pixels) whose integral is normalized to unity, and M(x, y) represents the map values of 1, 2 or 3. The three map levels are shown superimposed in FIG. 4A. White areas (M(x, y)=1) are taken from FIG. 4B, black areas (M(x, y)=2) are taken from FIG. 3D, and gray areas are taken from FIG. 4C to produce the final image in FIG. 4D.

The root-mean-square error (RMSE) for each image relative to the original was measured. The JPEG codec (FIG. 2C) had an error of 10.6 pixel-levels, where pixel levels were between 0–255 (8-bit gray levels). The present marking system (FIG. 2D) increased the error slightly, to 10.7 pixel-levels. After enhancing, the error was somewhat reduced in RMSE to 10.0, however the perceptibility of the error was greatly reduced.

There are two basic ways to construct the marking map. In the foregoing example, the original image was analyzed and a prediction, based on edge detection, was made of where an enhancement scheme, for example blurring, will fail. A second method for constructing the map is to use a fidelity metric or human observer to compare the original image to each of the different enhanced images over every region of the image. Human vision models (HVM) have been developed that can be used to automatically assess the visual fidelity of distorted images. An HVM may be developed that is specifically tailored for the detection of errors that occur in a single JPEG codec block, or between two JPEG codec blocks. By constraining the problem to JPEG, it is possible to employ more appropriate filters than the more general vision models have used in the past. By limiting the problem, issues that have not been completely addressed by previous models, such as masking effects, become more tractable.

In the foregoing example, a sum of square error (SSE) metric (after division by the quantization matrix) is used to decide on which coefficients to alter to achieve the desired parity for each block. For a binary code (one enhancement scheme), this scheme alters the coefficient whose value is closest to the cutoff point of the round-off quantization decision. The procedure for multiple enhancement schemes is discussed in more detail in Appendices 1 and 2. Although this SSE metric is not optimal, it is good enough to ensure a very small error (also discussed in the Appendices). A better method of adjusting the coefficients can be attained using an HVM. With a better HVM, several candidate coefficients could be chosen by the mean-square error (MSE) metric. Each candidate coefficient can then be adjusted in turn, and the resulting codec image assessed for fidelity by the HVM. By adjusting a coefficient (and thus incurring a small increase in MSE), the perceptual fidelity can in some instances even improve. It has been shown that the MSE of an image can be increased while simultaneously improving its perceptual fidelity.

In addition to finding the optimal coefficients to adjust for concealing the map, coefficients that contain useless information can simultaneously be removed at this stage. A known 'pre-quantizer' can determine which coefficients may be reduced (thus resulting in a reduction of bandwidth) without adding significant perceptual error. A coefficient may be entirely perceptually masked by the other coefficients, and therefore can be reduced to zero. Huffman coding encodes zero values quite efficiently, so a bit-rate savings is achieved by reducing coefficients to zero. Also, a coefficient value may compress poorly with Huffman coding, and hence cost more to send than its perceptual error reduction would merit, so that coefficient could be reduced as well. In conjunction with the described enhancement schemes, a reducer stage can be judiciously used to achieve the proper block parity. By adding the reducer stage, the image file can contain the map, have higher fidelity to the original, and require fewer bytes for storage all at the same time In order to implement the reducer stage an accurate fidelity metric is needed.

If there are many DCT coefficients, more elaborate maps can be included. By using a 3 or more way parity scheme, more bits can be hidden. The least two significant bits of the sum of all coefficients in a block could be used as a map for two separate enhancement schemes. An enhancement scheme that smooths the boundaries between blocks could also use two bits to indicate which edges of each block need smoothing. One bit can indicate the edge to the right and the other bit can indicate the bottom edge. Alternatively, one could have several enhancement schemes. To hide bits for two enhancement schemes, instead of using parity as the hidden bit (modulo 2), we could use modulo 3. If the sum of the coefficients modulo 3 was equal to 0, it would indicate no enhancement. If it was equal to 1 or 2, respective enhancement schemes 1 or 2 would be used. In general, n different schemes can be indicated by using the sum of the coefficients modulo n+1.

For example, consider an image enhanced by two schemes: one enhancement to remove the edge ringing artifact, and a second to smooth blocking artifacts. Every block may be marked to be processed or not by these two schemes with a 4-level map: 1-do not enhance, 2-de-ring, 3-de-block, 4-de-ring and de-block. However, if the two types of artifacts seldom occur together, then a 3-level map may be used: 1-do not enhance, 2-de-ring, 3-de-block.

In the foregoing example, a simple context-sensitive coding scheme was used. Blocks that had too few coefficients were not marked. A more elaborate context-sensitive system could also be used. If the two types of errors occur only in characteristic areas of the map, we can use a context sensitive code that only requires a two level map. For example, it may be that the edge ringing artifact occurs primarily in blocks that contain a high contrast edge. After producing the JPEG codec file, the two-level map may be extracted as before, but decoded as follows: if the block has a high contrast edge, 1-do not enhance, 2-de-ring; if the block has no high contrast edge, 1-do not enhance, 2-de-block.

Additionally, if an error is sparsely distributed across the blocks, the average error introduced by the marking system may be reduced by using a map with more levels that indicate no enhancement . For example, a de-ringing enhancer may only be needed in a small percentage of the image blocks. A three level map can then be used: 1-do not enhance, 2-do not enhance, 3-de-ring. Two-thirds of the blocks will start out with the appropriate parity for no enhancement such that no coefficient alterations are needed; therefore, the average error in these blocks will be smaller than with a two-level map. For the blocks that need de-ringing, the error will be larger. Since there are not many of these blocks, the overall error will be reduced.

There are several constraint s on the reconstructed image. For any JPEG image, there is a limited set of possible original images that could have produced the JPEG coefficient s after round-off. The final output image may therefore be constrained to at least be from this pool of candidate images. One way to do this is to adjust the DCT coefficient values for the enhanced image so they are the closest values to within the bounds of the JPEG coefficients. For example, an original image may have had two DCT coefficients with values of 2.6 and 1.8. After the quantization step, these values were rounded to 3 and 2, and after enhancement, they may have become 1.3 and 1.6. Since 1.3 could not have rounded to 3, the value is forced to 2.5 by adjusting the enhanced image. By these means, the RMSE between the enhanced image and the original is reduced, with a high likelihood (but no guaranteed) of having increased its perceptual fidelity as well. With the application of the constraint, the RMSE in the foregoing example was reduced from 10.0 to 9.5 pixel-levels.

As shown in FIG. 1, a full compression system requires three main systems; an enhancement scheme, an algorithm that can predict or measure where the enhancement scheme will fail, and a system for including this information with the image file. The last step has been described in detail, but the first two steps have been assumed to use simple algorithms. More sophisticated enhancement schemes and fidelity metrics are available. By combining these improved techniques with the marking system, a superior compression system may be produced. However, even with the foregoing simplifications, the technique is still very successful, as can be seen in FIG. 2A through FIG. 2D, comparing the present method and standard JPEG.

Figure 5A:
FIG. 5A is a density plot of the number of DCT coefficients that remain after quantization with a matrix 8 times the JPEG example matrix.
Figure 5B:
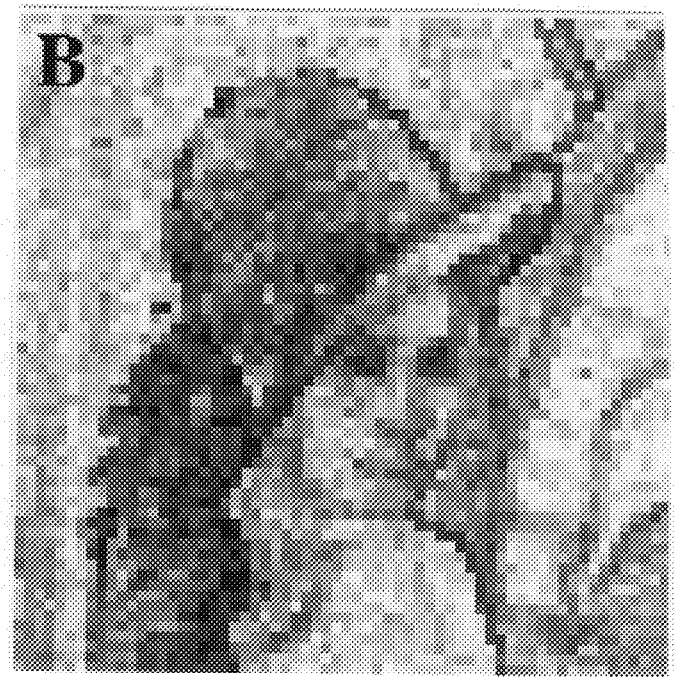
FIG. 5B is a plot similar to that FIG. 5A but having the matrix equal to the JPEG example matrix.
Figure 5C:
FIG. 5C is a marked codec file compressed with the 8-times matrix.
Figure 5D:
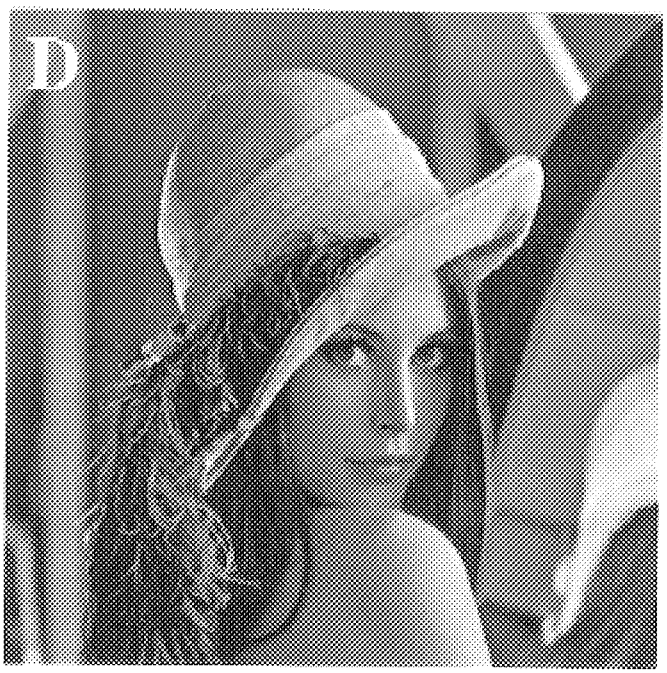
FIG. 5D is a marked codec file compressed with the 1-times matrix.

By comparing FIG. 2C and FIG. 2D it can be seen that even at a very severe compression rate, the map can be concealed in a standard JPEG file with very little visible difference from an ordinary JPEG file. At higher bit rates, the present method works even better, and more information can be hidden in the JPEG file without adding visible distortion. FIG. 5A through FIG. 5D show the marked file using a quantization matrix eight times the JPEG example matrix on the left and at one times the example matrix on the right. Above each codec image is a plot of how many non-zero coefficients are in each block. White has been normalized to DC only and black to 25 coefficients. As can be seen in FIG. 5B, there are far more coefficients in each block when less severe quantization is used, and therefore more chances for a coefficient close to the 50% point in round-off. Whenever the parity is changed, a fraction of a quantization level of additional error is added to the block. The fractions will be smaller with more coefficients (see FIG. 6 and the Appendices) and the size of a quantization level will be smaller, so the perceptibility of the added error gets much smaller as the quantization gets less severe.

Figure 6:
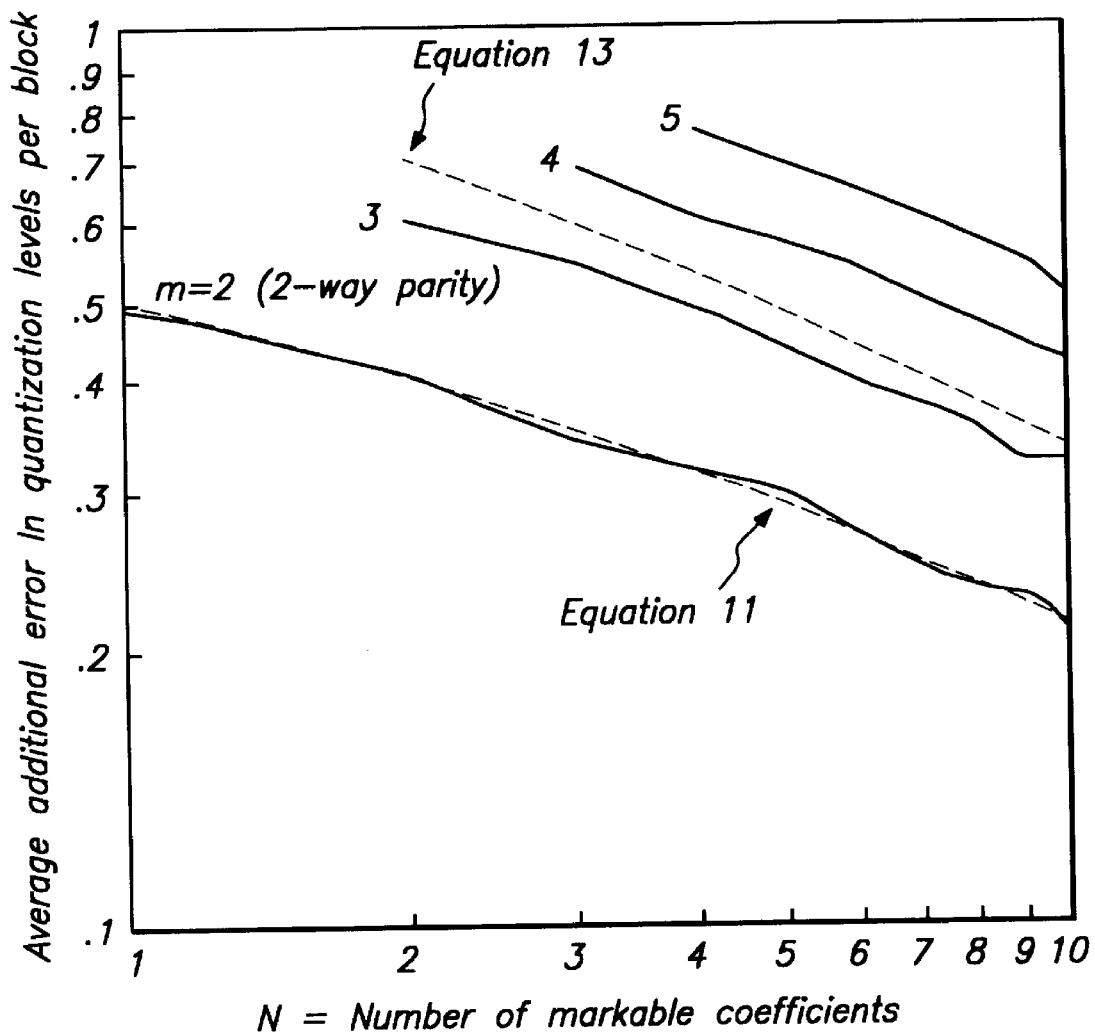
FIG. 6 is a simulation plot of the error introduced by the present marking scheme as a function of the number of coefficients in a block (n) and the number of parity states needed for the marking map (m).

In Appendix 1, the error for a 2-way parity marking scheme is derived, the approximate error for a 3-way parity marking scheme is calculated. In Appendix 2, a Monte Carlo simulation is used to calculate the error for a 2, 3, 4, and 5 way parity marking schemes. In FIG. 6 and in the Appendices, the variable m is used to represent the number of ways a block can be marked. FIG. 6 shows the results of these calculations and simulations. On the horizontal axis are the number of coefficients that can be changed. On the vertical axis is the amount of additional error (in Quantization levels) that will be added to an average block.

For a two way marking scheme (m=2), the error is $(2(n+1))^{-0.5}$ (see Appendix 1, Eq. 11). For example, when there are only three coefficients in a block (as are many of the marked blocks in FIG. 5C), the additional error in the marked coefficient will be ⅛ of a quantization level. When there are 10 coefficients per block (as are many of the marked blocks in FIG. 5D), the average error is about 0.21 of a quantization level, which is an invisibly small error.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

Appendix 1. The error produced by modifying a coefficient

The block marking scheme discussed herein uses the generalized block parity (sum of all the coefficients in a block modulo the number of enhancement possibilities) to specify which enhancement scheme to use for the block. This Appendix calculates the additional error associated with changing the value of one or more coefficients in order to achieve the desired parity.

The error size due to a modified round-off

Assume that the distortion error metric is the sum of square difference between the prequantized coefficient (after the DCT coefficient is divided by the quantization value) and the quantized coefficient. If, for example, the prequantized value is V=6.49, then the quantized value would be $N_1$=6 and the distortion error would be $0.49^2$. If the specification of the enhancement scheme requires a coefficient to be modified, then the quantized value may be shifted to $N_2$=7 with a distortion error of $0.51^2$. The difference in distortion is $y=0.51^2-0.49^2=0.02$. In general the difference in distortion is:

$$y = (V - N_2)^2 - (V - N_1)^2 \qquad (2)$$

$$= 2(N_1 - N_2)(V - N_{ave}), \qquad (3)$$

where $N_1$ is the closest integer to the value V, $N_2$ is the integer to which the value is rounded in order to select the proper parity, and $N_{ave}=(N_1+N_2)/2$. In almost all cases $|N_2-N_1|=1$ so that Eq. 3 can be written as:

$$y=2x, \qquad (4)$$

where $x=|V-N_{ave}|$ is the absolute value of the difference between the quantization value, V, and the half-integer point that separates rounding up and rounding down. The value of x will lie between 0 and 0.5.

The expected error for a uniform distribution

Suppose that there are n non-zero coefficients in the block being considered. To determine what is the expected value of the error assuming that each of the prequantized coefficients has a uniform distribution within the round-off range, assume that the value 6.3 is just as likely to occur as 6.9. To begin with, calculate the error incurred by changing the round-off direction of the coefficient that is mth closest to the half-integer point. For example, the four coefficients 4.2, 6.7, 1.1, .6. are the third, second, fourth and first closest to their respective half-integer points. To calculate the probability that the mth closest coefficient out of n coefficients has some value x, find the conjunct probability of a coefficient having that value (within a small interval dx), m−1 coefficients having a smaller value and n—m coefficients having a larger value. The probability that the mth closest point has a value between x and x+dx is:

$$P(m, n, x)dx = \binom{n-1}{m-1}\left[\left(\frac{x}{.5}\right)^{m-1}\right]\left[\frac{ndx}{.5}\right]\left[\left(\frac{.5-x}{.5}\right)^{n-m}\right]. \qquad (5)$$

The first term (in curved braces) is the combinatorial n−1 choose m−1, which represents the number of ways we can choose two groups of coefficients such that m−1 have a smaller value than x and n−m have a larger value than x. The second term is the probability that m−1 of the terms are in the interval from zero to x. The third term is the probability that any of the n terms are in the small interval dx. The fourth term is the probability that the remaining n−m terms are in the interval between x and 0.5.

Then, by using equation 4:

$$P(m, n, y)dy = \frac{n!}{(m-1)!(n-m)!} y^{m-1}(1-y)^{n-m}dy. \qquad (6)$$

From Eqs. 2–4, the expected value of the extra squared error incurred from shifting the round-off integer of one of the coefficients is calculated by finding $\hat{y}$ (the average value of y):

$$\hat{y} = \int_0^1 P(m,n,y)y\,dy / \int_0^1 P(m,n,y)dy. \qquad (7)$$

Equation 7 is simplified by noting that the integral in the denominator has limits that cover the entire range of the probability density function P, and therefore is equal to 1. This can also be seen by using the beta-function with integer arguments:

$$\int_0^1 y^{m-1}(1-y)^{n-m}dy = \frac{(m-1)!(n-m)!}{n!} \qquad (8)$$

Therefore $$\hat{y} = \frac{n!}{(m-1)!(n-m)!} \int_0^1 y^m(1-y)^{n-m}dy. \qquad (9)$$

The integral in equation 9 is also a beta-function, so the square error is:

The error introduced from hiding the marking map in the block parity will be less than Eq. 10, because some blocks will already have the correct parity. Consider first the case where only a single enhancement scheme is used (n=1). In that case, only a single coefficient need ever be altered, and it would be the coefficient with the smallest value of y, so that m=1. Thus from Eq. 10, the square error would increase by 1/(n+1). But the coefficient needs to be switched only for those blocks that have the wrong parity (which will be 50% of the blocks on average), so the error (after taking the square root) caused by marking a block is:

$$\text{Additional error per block}=(2(n+1))^{-0.5}. \qquad (11)$$

Now consider the case where two enhancement schemes are used so that the block parity is taken modulo 3. One third of the time the parity of the block already has the correct value, one third of the time the block sum must increase by 1 (or decrease by 2) and one third of the time the block sum must decrease by 1 (or increase by 2).

The average increase in the error is:

$$\Delta\text{error} = (1/3 \ (0 + 1/(n+1) + \qquad (12)$$
$$.5(2)/(n+1) + .5(1+2)/(n+1)))^{.5}$$
$$= ((7/6)/(n+1))^{.5}. \qquad (13)$$

The first term (the zero) corresponds to the cases where the block already has the correct parity. The second term corresponds to the cases where the coefficient with the smallest value of x is switched. The third term corresponds to the 50% of the remaining cases where the second to smallest value of x is rounded off in the opposite direction to the lowest value of x. Finally the last term is for the cases where the second to smallest value of x is in the same round-off direction as the lowest value, so that both the smallest and second smallest values of x must be switched.

The value given in Eq. 13 is an overestimate because it may be "cheaper" for a single coefficient to be rounded by a larger amount in the opposite direction rather than having two coefficients rounded by slightly smaller amounts. This can happen in two ways. First, one of the n coefficients might lie on the other side of the round-off point with an x value less than the sum of the lowest two x values. Second, even if all values are on the same side of the round-off point, if the first two x values are large (close to 0.5) then it may be cheaper to switch a coefficient to the neighboring integer in the opposite direction. Rather than derive analytic formulas taking all these nuances into account, a computer simulation, discussed in Appendix 2, has been developed for calculating the changes in sum of square errors for a range of values of m and n. The difference between Eq. 13 and the simulation is shown in FIG. 6.

Appendix 2.

Simulation for the general case of k marking states

The following Matlab function calculates the distortion error without making any of the assumptions that were made in Appendix 1 for obtaining a closed form answer.

```
1   function cost=Pcost3(states,coef,samples)
2   x = Rand(coef,samples); ix=round(x);
3   s_ones=ones(1,samples); s_zeros=zeros(1,samples);
4   default_par=rem(sum([ix;s_zeros]),states);
5   cost=zeros(1,states);
6   for par=0:(states-1)
7       wanted_par=ones(1,samples)*par;
8       steps_up=(ones(coef,1)*rem(wanted_par+states-default_par,
                states))>=((1:coef)' * ones(1,samples));
9       steps_down=(ones(coef,1)*rem(default_par+states-
                wanted_par, states))>=(1:coef)' * ones(1,samples));
10      ru = (.5-x+ix);   rd = (x-.5+(1-ix));
11      up=(sort([ru; s_ones]).*[steps_up; s_zeros]);
12      down=(sort([rd; s_ones]).*[steps_down; s_zeros]);
13      best=(sum(up.^2)<sum(down.^2));
14      new=ix+(ru<=ones(coef,1)*(max(up).*(1-best)))
                (rd<=ones(coef,1)*(max(down).*(1-best)));
15      new_mserr=mean(sum([abs(new-x);s_zeros]));
16      old_mserr = mean(sum([abs(ix-x);s_zeros]));
17      cost(par+1)=new_mserr-old_mserr;
18  end
```

Listing 1

The MSE was estimated by means of a Monte-Carlo simulation, and the distribution of coefficient values was modeled as either even or exponential. The model parameters are:

STATES: The number of parity states that can be represented in each block.

COEF: The number of non-zero coefficients in which the state information can be hidden.

SAMPLES: The number of blocks for the random simulation to average over for the error estimate.

The MSE introduced by the present marking scheme depends on how little the coefficients need to be adjusted to achieve the desired parity. The Matlab function shown in the listing generates samples number of simulated image blocks. Since the amount of error introduced only depends on the fractional part of each coefficient, only coefficient values between 0 and 1 are generated (line 2). Each coefficient is chosen at random from an even distribution (line 2). Each image block has the same number of nonzero coefficients. The output of the simulation is the approximate MSE added by the block marking scheme for blocks which have coef number of nonzero blocks, assuming that the coefficient values are from the simulated distribution.

The program generates a large matrix of simulated image blocks. The parity state of each block is defined as the remainder after the coefficients in that block have been rounded to the nearest integer (0 or 1), summed and then divided by the total number of states. Each block starts in a random parity-state. The blocks are then adjusted to each possible parity state in turn, by rounding coefficients either up or down.

For example, there may be 10 coefficients in each block and 5 parity states. Each coefficient is chosen randomly from an even distribution between 0 and 1. After rounding, the coefficients in the block sum to 6, parity state 1 (6/5= remainder 1). To adjust the block to have parity state 3, while introducing the least error, only two possible choices are possible: round 2 coefficients up, or we could round 3 coefficients down.

In general, there are always two possible ways to change the parity, one of which will result in the smallest error. In lines 8–10, there is calculated the number of round-ups or round-downs that would be needed to get the desired parity. In line 11, the coefficients that are closest to rounding up are found, and in line 12, the coefficients that are closest to rounding down are found. In line 13, a determination is made as to which of the two ways introduces the smallest amount of error.

In lines 14–17, the coefficients are rounded in the way that produces the least error. The amount of error introduced by the marking system is calculated and averaged across all of our simulated image blocks. FIG. 6 shows the results of the simulation. Image blocks with 1–10 non-zero coefficients per block were generated. The error introduced by marking with m marking schemes was calculated, for values of m=2,3,4 and 5. One thousand image blocks were simulated for each point on each curve.

For a typical number of coefficients per block and a 2 level map, the error is very small. For example, a block with 8 coefficients and a 2 level marking map will have an error of around 0.05 of a quantization level. This number of coefficients per block is typical of images compressed with the JPEG example quantization matrix (as shown in FIG. 5B). For complex images, a single quantization level is very roughly 1 JND, and so 0.05 of a quantization level is completely invisible.

What is claimed is:

1. Using a computer, a method of compressing an original image, comprising the steps of:

compressing said original image to produce a first compressed image;

decompressing said compressed image to produce a first decompressed image;

decompressing and applying an image enhancement technique to said compressed image to produce a second decompressed image;

comparing said first and second decompressed images to said original image;

determining first areas of said original image in which said first decompressed image exhibits greater fidelity to said original image and second areas of said original image in which said second decompressed image exhibits greater fidelity to said original image, and indicating said first and second area in a digital map; and producing a second compressed image having encoded therein said digital map.

2. The method of claim 1, comprising the further step of:

dividing the image into blocks of a predetermined size; and for each block, encoding within the image inclusion information as to whether that block belongs to said first area and whether that block belongs to said second area.

3. The method of claim 2, wherein said inclusion information is encoded within the block itself.

4. The method of claim 3, wherein each block is encoded as a plurality of transform coefficients, wherein inclusion information is encoded by altering at least one of said transform coefficients.

5. The method of claim 4, wherein each of said transform coefficients is calculated and then rounded-off, wherein altering at least one of said transform coefficients comprises:

calculating a sum of said plurality of transform coefficients;

performing a modulo N division of said sum to obtain a remainder; and forcing said remainder to be one of N values by altering at least one of said transform coefficients.

6. The method of claim 5 wherein altering at least one of said transform coefficients comprises identifying a selected transform coefficient having a fractional portion closest to 0.5 and altering said selected transform coefficient.

* * * * *